(12) United States Patent
Chadalapaka et al.

(10) Patent No.: US 7,089,378 B2
(45) Date of Patent: Aug. 8, 2006

(54) SHARED RECEIVE QUEUES

(75) Inventors: Mallikarjun Chadalapaka, Roseville, CA (US); David J. Garcia, Los Gatos, CA (US); Jeffrey R. Hilland, Cypress, TX (US); Paul R. Culley, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 341 days.

(21) Appl. No.: 10/401,231

(22) Filed: Mar. 27, 2003

(65) Prior Publication Data

US 2004/0193811 A1 Sep. 30, 2004

(51) Int. Cl.
*G06F 12/00* (2006.01)
(52) U.S. Cl. .................... 711/147; 711/130; 709/215
(58) Field of Classification Search ........ 711/147–148, 711/170–173, 202–209; 710/52–56; 709/212–222, 709/250
See application file for complete search history.

(56) References Cited

U.S. PATENT DOCUMENTS

| 5,325,532 A | 6/1994 | Crosswy et al. |
| 5,675,807 A | 10/1997 | Iswandhi et al. |
| 5,737,604 A | 4/1998 | Miller et al. |
| 5,751,932 A | 5/1998 | Horst et al. |
| 5,809,285 A | 9/1998 | Hilland |
| 5,815,707 A | 9/1998 | Krause et al. |
| 5,822,571 A | 10/1998 | Goodrum et al. |
| 5,870,568 A | 2/1999 | Culley et al. |
| 5,872,941 A | 2/1999 | Goodrum et al. |
| 5,914,953 A | 6/1999 | Krause et al. |
| 5,948,111 A | 9/1999 | Taylor et al. |
| 5,964,835 A | 10/1999 | Fowler et al. |
| 5,983,269 A | 11/1999 | Mattson et al. |
| 6,018,620 A | 1/2000 | Culley et al. |
| 6,047,323 A | 4/2000 | Krause |
| 6,070,198 A | 5/2000 | Krause et al. |
| 6,070,253 A | 5/2000 | Tavallaei et al. |
| 6,157,967 A | 12/2000 | Horst et al. |
| 6,163,834 A | 12/2000 | Garcia et al. |
| 6,233,702 B1 | 5/2001 | Horst et al. |
| 6,484,208 B1 | 11/2002 | Hilland |
| 6,493,343 B1 | 12/2002 | Garcia et al. |
| 6,496,940 B1 | 12/2002 | Horst et al. |
| 6,502,203 B1 | 12/2002 | Barron et al. |
| 2004/0049600 A1* | 3/2004 | Boyd et al. ................. 709/250 |
| 2004/0098369 A1* | 5/2004 | Elzur ............................. 707/1 |

FOREIGN PATENT DOCUMENTS

EP 0757318 A2 2/1997

* cited by examiner

*Primary Examiner*—Nasser Moazzami

(57) ABSTRACT

The disclosed embodiments relate to a queuing mechanism that may comprise a shared receive queue having a plurality of buffers. The queuing mechanism may also comprise a plurality of queue pairs, each of the plurality of queue pairs having a receive queue that comprises at least one of the plurality of buffers.

14 Claims, 4 Drawing Sheets

SHARED RECEIVE QUEUES

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the field of computer systems, it may be desirable for information to be transferred from a system memory associated with one computer system to a system memory associated with another computer system. Queue pairs ("QPs") may be used to facilitate such a transfer of data. Each QP may include a send queue ("SQ") and a receive queue ("RQ") that may be utilized in transferring data from the memory of one device to the memory of another device. The QP may be defined to utilize an allocated number of memory blocks or buffers for each RQ and SQ.

The allocation of specific number of buffers for each SQ and RQ may be inefficient if some RQs and SQs are idle. This situation may occur frequently in a multi-client computing environment that supports numerous QPs. As a result of these inefficiencies; overall system performance may be degraded.

BRIEF DESCRIPTION OF THE DRAWINGS

Advantages of the invention may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The Remote Direct Memory Access ("RDMA") Consortium, which includes the assignee of the present invention, is developing specifications to improve ability of computer systems to remotely access the memory of other computer systems. One such specification under development is the RDMA Consortium Protocols Verb specification, which is hereby incorporated by reference. The verbs defined by this specification may correspond to commands or actions that may form a command interface for data transfers between memories in computer systems, including the formation and management of queue pairs, memory windows, protection domains and the like.

RDMA may refer to the ability of one computer to directly place information in the memory space of another computer, while minimizing demands on the central processing unit ("CPU") and memory bus. In an RDMA system, an RDMA layer may interoperate over any physical layer in a Local Area Network ("LAN"), Server Area Network ("SAN"), Metropolitan Area Network ("MAN"), or Wide Area Network ("WAN").

Figure 1:
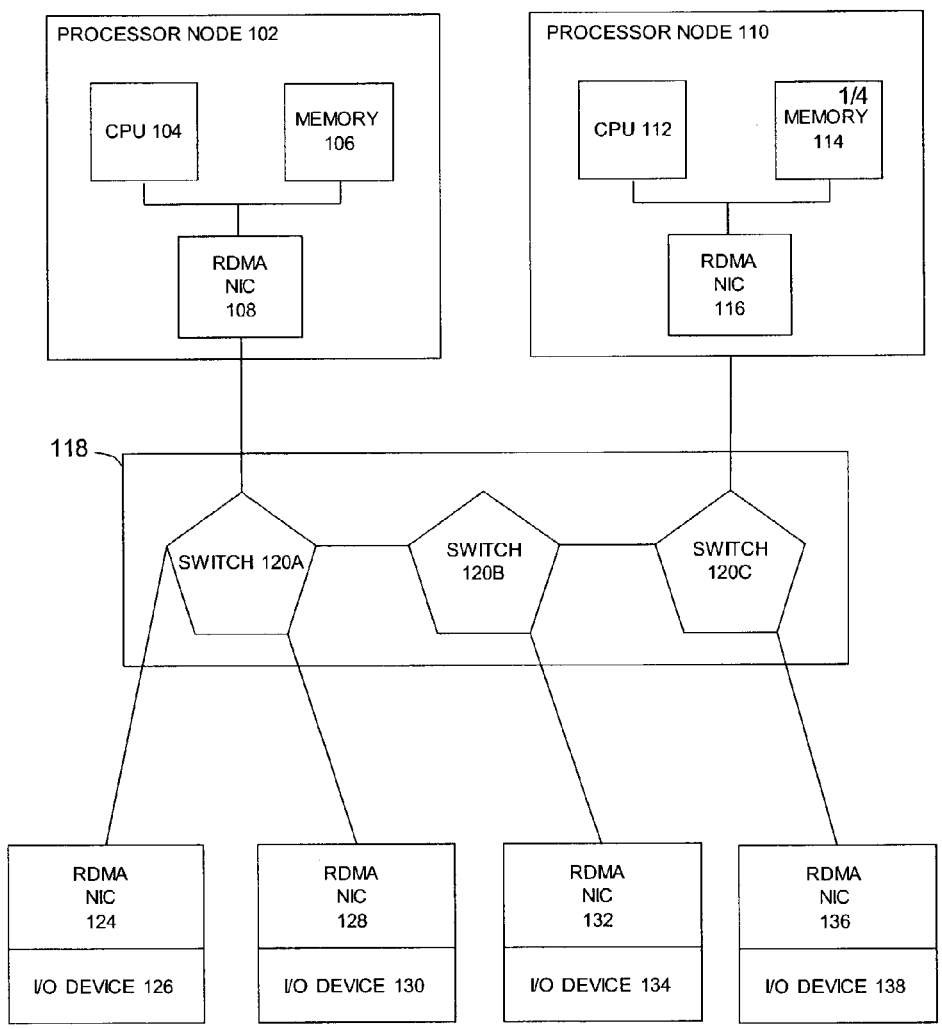
FIG. 1 is a block diagram illustrating a computer network in accordance with embodiments of the present invention.

Referring now to FIG. 1, a block diagram illustrating a computer network in accordance with embodiments of the present invention is illustrated. The computer network is indicated by the reference numeral 100 and may comprise a first processor node 102 and a second processor node 110, which may be connected to a plurality of I/O devices 126, 130, 134, and 138 via a switch network 118. Each of the I/O devices 126, 130, 134 and 138 may utilize a Remote Direct Memory Access-enabled Network Interface Card ("RNIC") to communicate with the other systems. In FIG. 1, the RNICs associated with the I/O devices 126, 130, 134 and138 are identified by the reference numerals 124, 128, 132 and 136, respectively. The I/O devices 126, 130, 134, and 138 may access the memory space of other RDMA-enabled devices via their respective RNICs and the switch network 118.

The topology of the network 100 is for purposes of illustration only. Those of ordinary skill in the art will appreciate that the topology of the network 100 may take on a variety of forms based on a wide range of design considerations. Additionally, NICs that operate according to other protocols, such as InfiniBand, may be employed in networks that employ such protocols for data transfer.

The first processor node 102 may include a CPU 104, a memory 106, and an RNIC 108. Although only one CPU 104 is illustrated in the processor node 102, those of ordinary skill in the art will appreciate that multiple CPUs may be included therein. The CPU 104 may be connected to the memory 106 and the RNIC 108 over an internal bus or connection. The memory 106 may be utilized to store information for use by the CPU 104, the RNIC 108 or other systems or devices. The memory 106 may include various types of memory such as Static Random Access Memory ("SRAM") or Dynamic Random Access Memory ("DRAM").

The second processor node 110 may include a CPU 112, a memory 114, and an RNIC 116. Although only one CPU 112 is illustrated in the processor node 110, those of ordinary skill in the art will appreciate that multiple CPUs may be included therein. The CPU 112, which may include a plurality of processors, may be connected to the memory 114 and the RNIC 116 over an internal bus or connection. The memory 114 may be utilized to store information for use by the CPU 112, the RNIC 116 or other systems or devices. The memory 114 may utilize various types of memory such as SRAM or DRAM.

The switch network 118 may include any combination of hubs, switches, routers and the like. In FIG. 1, the switch network 118 comprises switches 120A–120C. The switch 120A connects to the switch 120B, the RNIC 108 of the first processor node 102, the RNIC 124 of the I/O device 126 and the RNIC 128 of the I/O device 130. In addition to its connection to the switch 120A, the switch 120B connects to the switch 120C and the RNIC 132 of the I/O device 134. In addition to its connection to the switch 120B, the switch 120C connects to the RNIC 116 of the second processor node 110 and the RNIC 136 of the I/O device 138.

Each of the processor nodes 102 and 110 and the I/O devices 126, 130, 134, and 138 may be given equal priority and the same access to the memory 106 or 114. In addition, the memories may be accessible by remote devices such as the I/O devices 126, 130, 134 and 138 via the switch network 118. The first processor node 102, the second processor node 110 and the I/O devices 126, 130, 134 and 138 may exchange information using queue pairs ("QPs"). The exchange of information using QPs is explained with reference to FIG. 2.

Figure 2:
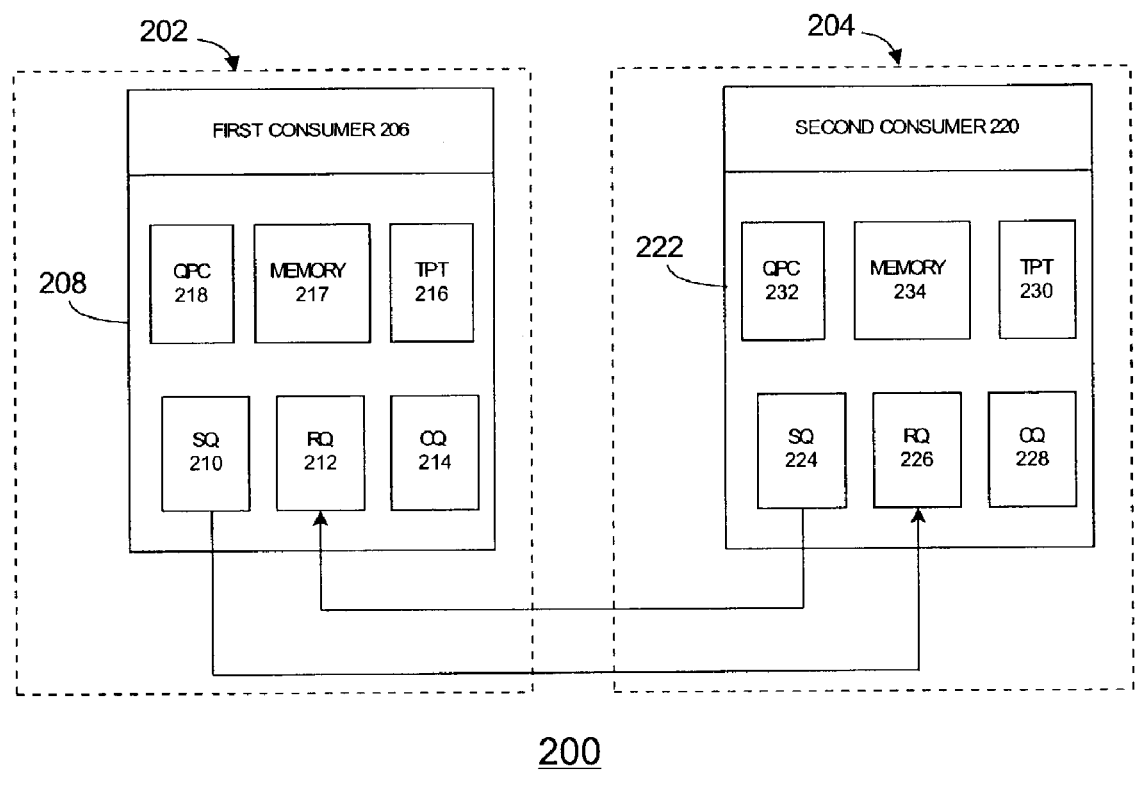
FIG. 2 is a block diagram that illustrates the use of a queue pair to transfer data between devices in accordance with embodiments of the present invention.

FIG. 2 is a block diagram that illustrates the use of a queue pair to transfer data between devices in accordance with embodiments of the present invention. The figure is generally referred to by the reference numeral 200. In FIG. 2, a first node 202 and a second node 204 may exchange information using a QP. The first node 202 and second node 204 may correspond to any two of the first processor node 102, the second processor node 110 or the I/O devices 126, 130, 134 and 138 (FIG. 1). As set forth above with respect to FIG. 1, any of these devices may exchange information in an RDMA environment.

The first node 202 may include a first consumer 206, which may interact with an RNIC 208. The first consumer 206 may comprise a software process that may interact with various components of the RNIC 208. The RNIC 208, may correspond to one of the RNICs 108, 116, 126, 130, 134 or 138 (FIG. 1), depending on which of devices associated with those RNICs is participating in the data transfer. The RNIC 208 may comprise a send queue 210, a receive queue 212, a completion queue ("CQ") 214, a memory translation and protection table ("TPT") 216, a memory 217 and a QP context 218.

The second node 204 may include a second consumer 220, which may interact with an RNIC 222. The second consumer 220 may comprise a software process that may interact with various components of the RNIC 222. The RNIC 222, may correspond to one of the RNICs 108, 116, 126, 130, 134 or 138 (FIG. 1), depending on which of devices associated with those RNICs is participating in the data transfer. The RNIC 222 may comprise a send queue 224, a receive queue 226, a completion queue 228, a TPT 230, a memory 234 and a QP context 232.

The memories 217 and 234 may be registered to different processes, each of which may correspond to the consumers 206 and 220. The queues 210, 212, 214, 224, 226, or 228 may be used to transmit and receive various verbs or commands, such as control operations or transfer operations. The completion queue 214 or 228 may store information regarding the sending status of items on the send queue 210 or 224 and receiving status of items on the receive queue ("RQ") 212 or 226. The TPT 216 or 230 may comprise a simple table or an array of page specifiers that may include a variety of configuration information in relation to the memories 217 or 234.

The QP associated with the RNIC 208 may comprise the send queue 210 and the receive queue 212. The QP associated with the RNIC 222 may comprise the send queue 224 and the receive queue 226. The arrows between the send queue 210 and the receive queue 226 and between the send queue 224 and the receive queue 212 indicate the flow of data or information therebetween. Before communication between the RNICs 208 and 222 (and their associated QPs) may occur, the QPs may be established and configured by an exchange of commands or verbs between the RNIC 208 and the RNIC 222. The creation of the QP may be initiated by the first consumer 206 or the second consumer 220, depending on which consumer desires to transfer data to or retrieve data from the other consumer.

Information relating to the configuration of the QPs may be stored in the QP context 218 of the RNIC 208 and the QP context 232 of the RNIC 222. For instance, the QP context 218 or 232 may include information relating to a protection domain ("PD"), access rights, send queue information, receive queue information, completion queue information, or information about a local port connected to the QP and/or remote port connected to the QP. However, it should be appreciated that the RNIC 208 or 222 may include multiple QPs that support different consumers with the QPs being associated with one of a number of CQs.

To prevent interferences in the memories 217 or 234, the memories 217 or 234 may be divided into memory regions ("MRs"), which may contain memory windows ("MWs"). An entry in the TPT 216 or 230 may describe the memory regions and may include a virtual to physical mapping of a portion of the address space allocated to a process. These memory regions may be registered with the associated RNIC and the operating system. The nodes 202 and 204 may send a unique steering tag ("STag") to identify the memory to be accessed, which may correspond to the memory region or memory window.

The STag may be used to identify a buffer that is being referenced for a given data transfer. A tagged offset ("TO") may be associated with the STag and may correspond to an offset into the associated buffer. Alternatively, a transfer may be identified by a queue number, a message sequence number, and/or message offset. The queue number may be a 32-bit field, which identifies the queue being referenced. The message sequence number may be a 32-bit field that may be used as a sequence number for a communication, while the message offset may be a 32-bit field offset from the start of the message.

Also, the node 202 or 204 may have a unique QP identity for communications with the other node 202 or 204. By using QP, the access to the memory regions and memory windows by the node 202 or 204 over the designated QP may be enabled for QPs having the same PD. Each of the RQs 212 and 226 for the respective QPs may include buffers that are dedicated to that RQ and be allocated from the memory 217 or 234. These buffers may be blocks of memory that are allocated when the RQs 212 and 226 are created. Accordingly, it may be beneficial for the RQs 212 and 226 to share buffers across multiple QPs. As such, the buffers may be allocated to a shared receive queue and allocated when a request is received. Thus, the plurality of shared buffers may be utilized to allow the RQs 212 and 226 for various QPs to pool resources to enhance the operation of the node. In this manner, RQs 212 and 226 may avoid dropping connections when the buffers are pre-allocated to different processes that are not efficiently utilizing them. The interaction between QPs, RQs, SQs, in the context of data transfers employing a queuing mechanism or shared receive queue ("S-RQ") with multiple QPs is explained with reference to FIG. 3.

Figure 3:
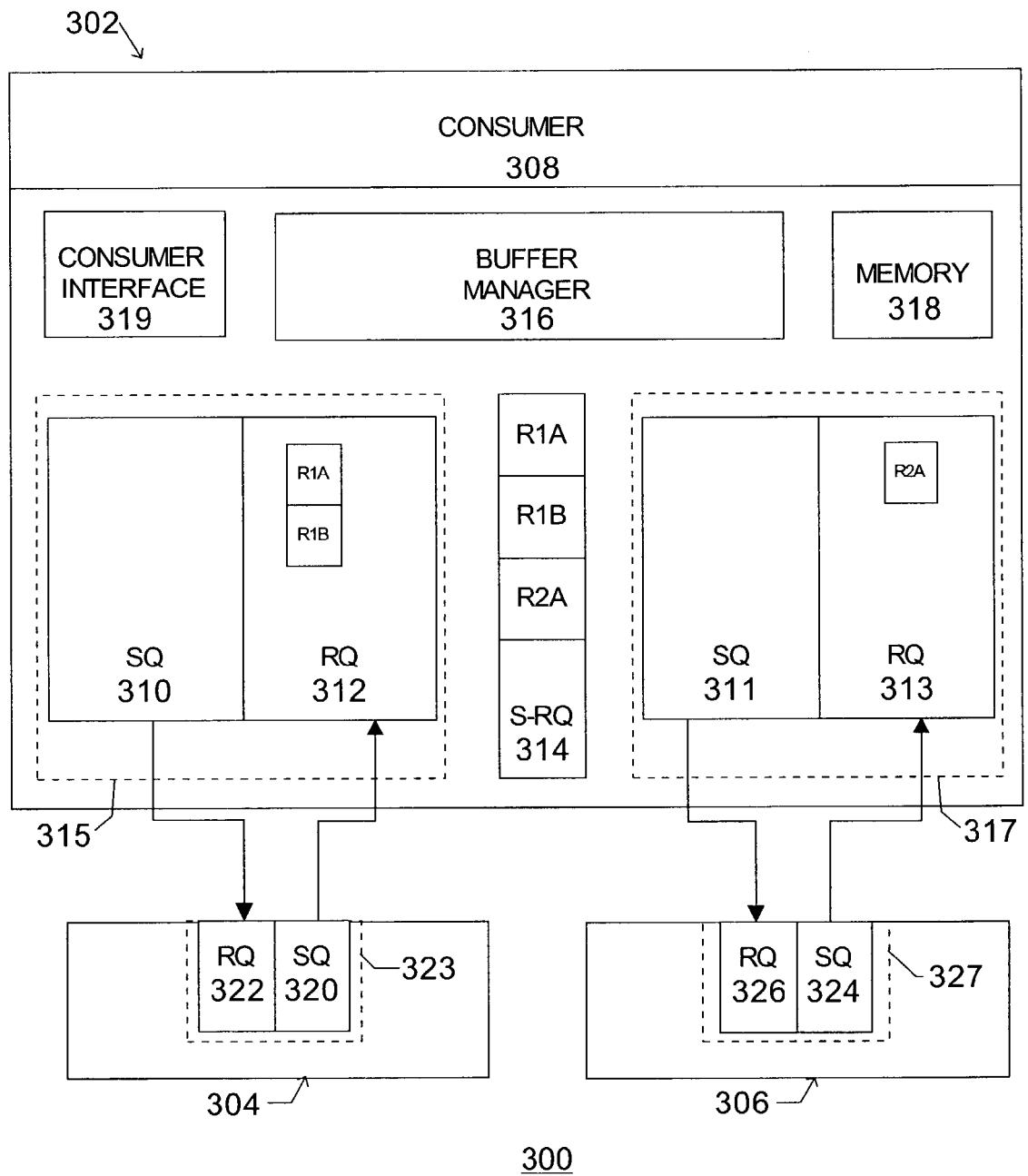
FIG. 3 is a block diagram illustrating data exchange using a shared receive queue with multiple queue pairs in accordance with embodiments of the present invention.

FIG. 3 is a block diagram illustrating data exchange using a shared receive queue with multiple queue pairs in accordance with embodiments of the present invention. The diagram is generally referred to by the reference numeral 300. A consumer 308 may operate processes, upper layer protocols, or applications on a node 302, which may correspond to one of the nodes 202 or 204 (FIG. 2). The node 302 may include a first send queue 310 and a second send queue 311, which may correspond to the send queues 210 and 224 of FIG. 2. Additionally, a first receive queue 312 and a second receive queue 313 may be associated with each of the respective receive queues 212 and 226 of FIG. 2. The use of two sets of send queues and receive queues indicates that two sets of QPs have been established for communication between the server node 302 and other devices. The send queue 310 and the receive queue 312 together form a QP that is identified by the reference numeral 315. The send queue 311 and the receive queue 313 together form a QP that is identified by the reference numeral 317.

The QP 315 may be adapted to exchange information with a corresponding QP 323, which may comprise a send queue 320 and a receive queue 322. The QP 323 may be located in a node 304, which may correspond to a device with which the server node 302 is exchanging information. The arrows between the send queue 310 and the receive queue 322 and between the send queue 320 and the receive queue 312 indicate the flow of information therebetween. Similarly, the QP 317 may be adapted to exchange information with a corresponding QP 327, which may comprise a send queue 324 and a receive queue 326. The QP 327 may be located in a node 306, which may correspond to a device with which the server node 302 is exchanging information. The arrows between the send queue 311 and the receive queue 326 and between the send queue 324 and the receive queue 313 indicate the flow of information therebetween.

The receive queues 312 and 313 may be associated with a queuing mechanism or shared receive queue ("S-RQ") 314. When messages directed to the receive queues 312 and 313 are received, the request for buffers to place the message may be redirected to the S-RQ 314. The S-RQ 314 may be a located in a memory 318, which may be located anywhere within the node 302. The S-RQ 314 may include a group of buffers that may be created by a verb or command, at initialization of the node 302 or other suitable time. The buffers may be contiguous blocks of memory that are utilized by the RQs 312, 313. Accordingly, the S-RQ 314 may share a group of buffers with various RQs based on various parameters, such as a common protection domain for a specific consumer. The size of the S-RQ 314 may be set by the consumer 308 and may be modified by limitations or other verbs or commands to maintain operation.

A buffer manager 316, which may manage the operation of the S-RQ 314, may assign buffers to the RQs when requested by a consumer or when a request is received, such as a work request ("WR"), an incoming RDMA read or write request, or send with invalidate, send with solicited event, send with solicited event and invalidate, or any other similar request. A consumer interface 319 may be used to process incoming requests from the consumer 308, such as when completion of the incoming data has been determined. In response to requests received from the consumer 308 via the consumer interface 319, the buffer manager 316 may act to limit the number of buffers associated with the RQ 312 or 313 in the S-RQ 314. Requests to the buffer manager 316 may also dictate the total number of buffers to associate with the S-RQ 314.

The S-RQ 314 may be implemented and managed through the use of verbs or commands. For instance, a "Create S-RQ" verb may be issued to establish the S-RQ 314. A "Modify S-RQ" verb may be used to modify the characteristics of the S-RQ 314, such as the number of buffers associated with a particular receive queue. A "Destroy S-RQ" verb may be used to remove the S-RQ 314, when the associated QPs have completed their data transmissions. Those of ordinary skill in the art will appreciate that other verbs or commands may be devised for the management of the S-RQ 314.

Verbs or commands used in the creation and maintenance of QPs may also be used to impact the S-RQ 314. For example, a "Create QP" verb or command may indicate that the S-RQ 314 is to be utilized by the QP. The indication may involve a setting within verb or command or an associated argument. Further, a "Poll CQ" verb or command may include additional output identifiers. The output identifiers may be used to communicate information about the structure and operation of the S-RQ 314 to the consumer 308.

A data transfer operation to an anonymous buffer may be initiated by a work request with a message. The message may be a send type message, an RDMA read type message, an RDMA write type message, or other similar message. If a message, such as a send type message, is directed to a specific QP, then the message may be directed to a receive buffer that is in the S-RQ 314 as a work queue entry ("WQE"). The posting of the message as a WQE may include a list of memory locations, such as memory windows or memory regions, from which data is intended to be read or written. The receive buffer may be posted to the RQ 312 or 313 from the S-RQ 314 depending on the appropriate QP associated with the message. The receive buffers pointed to by the WQEs may be removed from the S-RQ 314 in an implementation specific order that may be unique for each S-RQ 314. The protection domain associated with a WQE may be validated against protection domain information in the S-RQ 314 to make sure the operation is authorized. Accordingly, the S-RQ 314 may be accessed in any order with respect to the S-RQ 314, but may preserve the order for an individual receive queue or associated send queue. When the message represented by a WQE is completed, the completion may be posted to the completion queue of the affected QP.

In an exemplary operation of the S-RQ 314 in the node 302, the nodes 304 and 306 may send requests to access the memory 318 or work requests may be generated by the consumer 308. The RQs 312 and 313 may be associated with a protection domain that is associated with the S-RQ 314, the respective QP, the S-RQ 314 and the associated QP, or other suitable components. For example, if RQs 312 and 313 are associated with a protection domain of the S-RQ 314, any RQ associated with the protection domain may utilize the S-RQ 314 and any validation for the S-RQ 314 may verify the protection domain in the S-RQ 314. Requests may result in the allocation of S-RQ buffers to the various RQs 312 and 314. For instance, if a request is received on QP 315, a buffer R1A in the S-RQ 314 may be allocated to the RQ 312. Similarly, if a request is received on QP 317, a buffer R2A in the S-RQ 314 may be allocated to RQ 313. If another request is received on QP 315, another buffer R1B in the S-RQ 314 may be allocated to the RQ 312. When the respective data transfers are completed, the buffers R1A, R1B and R2A may be reallocated from the RQs 312 and 313 to the S-RQ 314.

Advantageously, the S-RQ 314 may reduce the dependence on an upper level communication protocol to provide flow control of information delivered to RQs. Instead of relying on an upper level protocol of the consumer 308, flow control of incoming messages may be provided by the buffer manager 316 by locally handling asynchronous events. The buffer manager 316 may effectively provide flow control over multiple communication channels (QPs), which share RQs via the S-RQ 314. This means that adapting to the changing buffer requirements between the QPs may be faster. Accordingly, the S-RQ 314 may improve response time for adjusting buffers across multiple QPs.

Various error semantics may be implemented to address errors in the operation of the S-RQ 314. For instance, errors relating to a specific QP may be reported through the completion of the WQE in a manner that is non-interruptive. If the S-RQ 314 fails catastrophically, each of the QPs associated with the S-RQ 314 may be flushed.

One error that may occur is the out of order receipt of a request. One approach to process out of order requests is to have a sufficiently large number of buffers from the S-RQ 314 posted to the RQ 312 or 313. If not enough buffers are available, however, a connection may be dropped. Other approaches to processing out of order packets may involve dropping the request that is out of order, dropping subsequent requests that are prior to the out of order packet, pausing the QP processing or the like. As appreciated by those in the art, the approach implemented may vary depending on design preferences.

Figure 4:
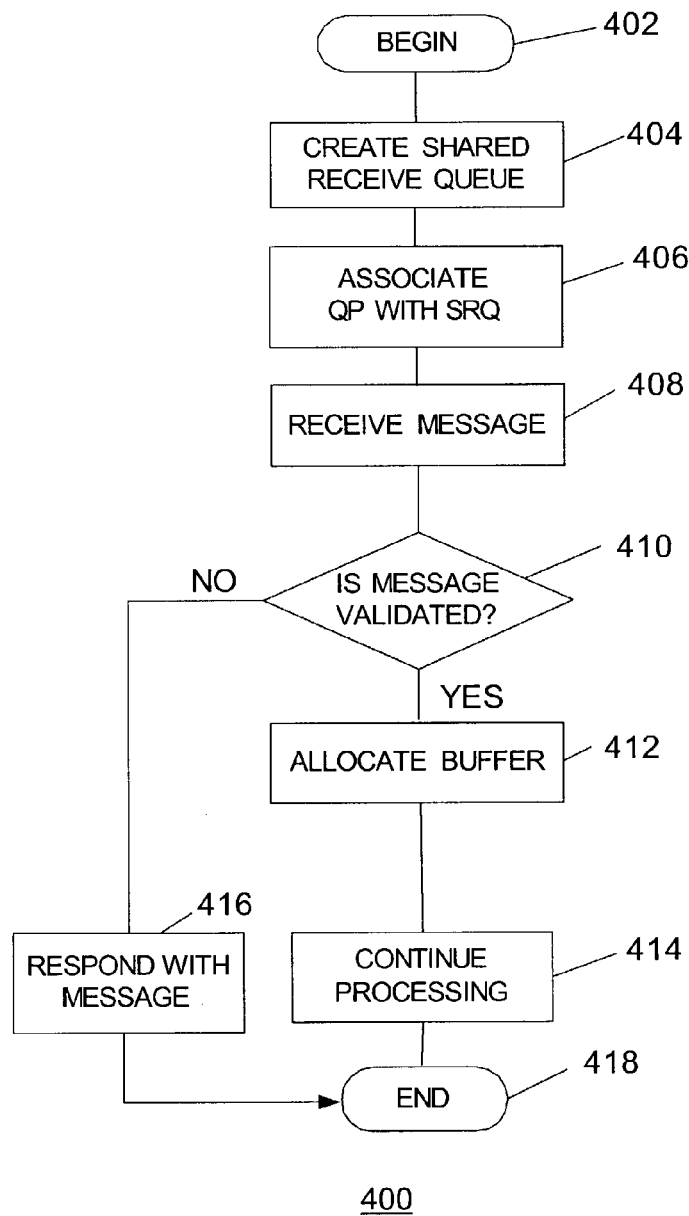
FIG. 4 is a process flow diagram showing the operation of a shared receive queue in accordance with embodiments of the present invention.

FIG. 4 is a process flow diagram showing the operation of a shared receive queue in accordance with embodiments of the present invention. In the diagram, generally referred to by reference numeral 400, a shared receive queue may be implemented and may be utilized in a node, such as the node 302 (FIG. 3). The shared receive queue or S-RQ may correspond to the S-RQ 314 (FIG. 3). The process begins at block 402. At block 404, an S-RQ may be created within a memory device associated with the node. As set forth above, the S-RQ may be created automatically upon initialization of the node or created by the execution of a verb or command.

As shown in block 406, various QPs, such as QP 312 and 313 (FIG. 3) may be associated with the S-RQ. The QPs may be associated with the S-RQ when each of the RQs is created and the association may be based on a protection domain or other factors.

At block 408, a request, such as a work request or an RDMA read or write request, may be received for processing by the node. The request may be directed to a QP that is associated with the S-RQ. When the request is received, the request may be validated through various processes. If the request is validated (block 410), a buffer may be allocated from the S-RQ to the RQ that corresponds to that request, as shown at block 412. Then at block 414, the request may continue further processing using the S-RQ that was created. The processing of the request may involve accessing a memory segment, executing a command or the like. However, if the request cannot be validated (block 410), then a response message may be generated at block 416. The response to the request may include terminating the connection or sending an invalid request message. Accordingly, the process ends at block 418.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A queuing mechanism, comprising:
    a shared receive queue that comprises a plurality of buffers; and
    a plurality of queue pairs, each of the plurality of queue pairs having a receive queue that is associated with at least one of the plurality of buffers, wherein each of the plurality of queue pairs has an attribute associated therewith, the attribute associating the queue pair with the shared receive queue, and wherein the attribute relates to a protection domain.

2. The queuing mechanism set forth in claim 1, wherein a request for access via one of the plurality of queue pairs is validated if the request corresponds to the attribute.

3. The queuing mechanism set forth in claim 1, wherein one of the plurality of buffers is associated with the receive queues if the request corresponds to the attribute.

4. The queuing mechanism set forth in claim 1, wherein the shared receive queue is established by execution of a verb.

5. The queuing mechanism set forth in claim 1, wherein the shared receive queue is established upon initialization of a hosting node.

6. A computer network, comprising:
    a plurality of computer systems;
    at least one input/output device;
    a switch network that connects the plurality of computer systems and the at least one input/output device for communication; and
    wherein the plurality of computer systems and the at least one input/output device comprises a memory window access mechanism, the queuing mechanism comprising:
        a shared receive queue that comprises a plurality of buffers; and
        a plurality of queue pairs, each of the plurality of queue pairs having a receive queue that is associated with at least one of the plurality of buffers, wherein each of the plurality of queue pairs has an attribute associated therewith, the attribute associating the queue pair with the shared receive queue, and wherein the attribute relates to a protection domain.

7. The computer network set forth in claim 6, wherein a request for access via one of the plurality of queue pairs is validated if the request corresponds to the attribute.

8. The queuing mechanism set forth in claim 6, wherein one of the plurality of buffers is associated with the receive queues if the request corresponds to the attribute.

9. The computer network set forth in claim 6, wherein the shared receive queue is established by execution of a verb.

10. The computer network set forth in claim 6, wherein the shared receive queue is established upon initialization of a hosting node.

11. A method for providing access to a shared receive queue, the method comprising the acts of:
    creating a shared receive queue having a plurality of buffers;
    defining a plurality of queue pairs, each of the plurality of queue pairs having a receive queue;
    defining an attribute to associate the plurality of queue pairs with the shared receive queue;
    defining a protection domain to associate the plurality of queue pairs with the shared receive queue;
    verifying a request directed to one of the plurality of queue pairs; and
    posting a subset of the plurality of buffers to correspond with one of the receive queues.

12. The method set forth in claim 11, comprising accessing a memory associated with the shared receive queue via one of the plurality of queue pairs.

13. The method set forth in claim 11, comprising issuing a verb to create the shared receive queue.

14. The method set forth in claim 11, comprising modifying the plurality of buffers through the issuance of a verb to adjust the size of the plurality of buffers.

* * * * *

UNITED STATES PATENT AND TRADEMARK OFFICE
CERTIFICATE OF CORRECTION

PATENT NO. : 7,089,378 B2 Page 1 of 1
APPLICATION NO. : 10/401231
DATED : August 8, 2006
INVENTOR(S) : Mallikarjun Chadalapaka et al.

It is certified that error appears in the above-identified patent and that said Letters Patent is hereby corrected as shown below:

On the face page, in field (73), in "Assignee", in column 1, line 2, delete "l.P." and insert -- L.P. --, therefor.

Signed and Sealed this

Eighth Day of September, 2009

David J. Kappos
*Director of the United States Patent and Trademark Office*